Patented Jan. 6, 1948

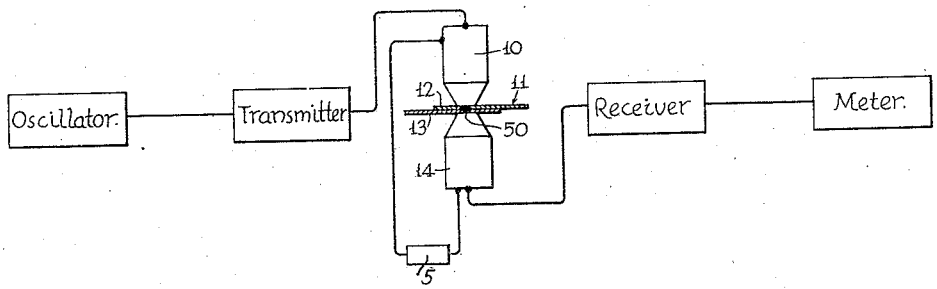
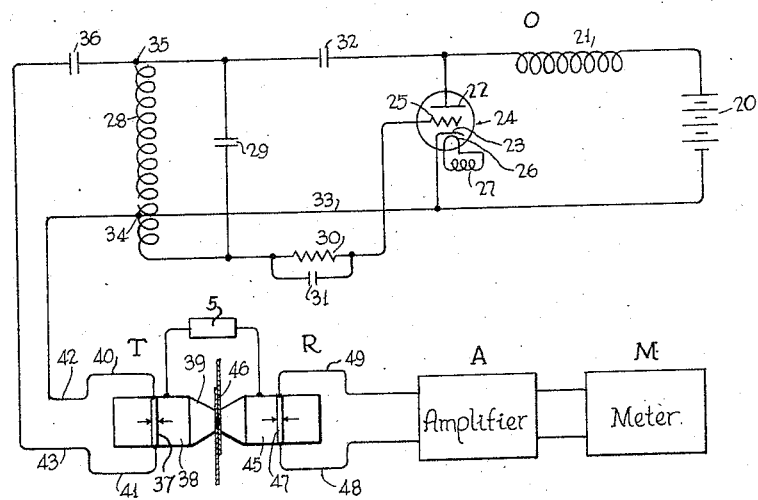

2,433,963

UNITED STATES PATENT OFFICE 2,433,963

WELD TESTING APPARATUS

John P. Tarbox and Edwin M. Callender, Philadelphia, Pa., assignors to The Budd Company, Philadelphia, Pa., a corporation of Pennsylvania Application July 2, 1943, Serial No. 493,256

14 Claims. (Cl. 219—4)

This invention relates to a method and apparatus for detecting variations in the physical state of metals or other materials primarily in sub-surface areas. The invention has particular utility in connection with the detection of faulty welds in welding apparatus.

In many manufacturing operations, transformations occur in the physical state of a substance at points where inspection is impossible. An example of such a manufacturing operation is that of resistance welding where by means of an electric current passed through the junction of separate metal articles, the material is heated to the point of fusion to secure a rigid and strong joint between the articles. In this type of welding, should an inadequate amount of fusion occur so that the normal strength of the joint is materially reduced, the operator of the welding apparatus has ordinarily no immediate means of inspection or test to ascertain this fact, and consequently the weld and the article of manufacture is defective.

It is an object therefore of the present invention to provide means for detecting deviations from normal in the physical state of materials employed in manufacturing operations and processes. A further object is to provide means for detecting deviations from normal in the physical state of a material under treatment which is usable at the time that the material is being treated. Specifically, an object of the invention is to provide effective means for detecting defective welds in electric resistance welding substantially at the time the weld is being made. An object also contemplated is the provision of means for detecting defective welds which may include audible means for signaling the operator of the defect in the weld. Other objects include the provision of means for faulty weld detection which utilizes radiation within the sonic or supersonic range; the provision of detecting apparatus for weld defects utilizing the combination of electrical and mechanical oscillations; and the provisions of circuit apparatus of simplified form which accomplishes the results of the invention in an economical and efficient manner. Other objects of the invention will appear on consideration of the following description of a selected embodiment of the invention in conjunction with the drawing, in which:

Fig. 1 is a block diagram indicating the sequence of energy flow; and

Fig. 2 is a wiring diagram of a form of electric oscillator circuit with diagrammatic illustration of the connection of the electrodes of a resistance welder.

In many manufacturng operations, particularly involving heat application, the material utilized undergoes certain physical transformations usually resulting from the application of heat. Because of the difficulty of ascertaining the condition of the material below the surface of the same, defects frequently occur, arising from a deviation from the expected and normal transformation. This problem is of particular importance in electric welding, and the invention, therefore, for illustrative purposes, is directly associated with resistance welding. In Fig. 1 of the drawing a flow circuit is indicated in which energy originating in the oscillator is passed to a transmitter and from the transmitter directly to electrode 10 of a resistance welder. From this point the energy passes through the workpiece 11, the workpiece as illustrated, consisting of two adjoining plates 12 and 13, through the co-acting electrode 14, and thence through receiver to the meter. The welding power source and controls for the electrodes are indicated at 5.

Briefly, the procedure of the detection as applied to resistance welding comprises the origination in the oscillator of a constant flow of energy by any appropriate means, either mechanical or electrical, transmitting this energy to the materials welded between the electrodes of the welder and detecting this normal energy flow by any appropriate means such as an oscilloscope, an audiometer or sound meter. Having established this normal rate of energy flow and provided means for observation of the same, the welding period is initiated and if for any reason the weld is defective, such as may be due to improper, or inadequate amount of, fusion, the meter will indicate the variation in the normal supply of energy.

The detailed appearatus by which the energy is supplied the weld is more clearly illustrated by the diagrammatic drawing in Fig. 2 in which an electric oscillator O which may be of any desired type is employed to establish a sine wave oscillation which is applied to an appropriate transmitting means. In the oscillator we employ a source 20 of direct current which is applied through the choke 21, to the plate 22 and cathode 23 of a vacuum triode tube 24, the tube also having a control grid 25 and a heater element 26 appropriately connected to the secondary 27 of a heating transformer, as is well understood in this art. Connected between the plate and the grid 25 is a "tank" circuit including inductance 28 and capacitance 29. In series with the "tank" circuit, on the plate side is the capacitance 32, and on the grid side the high resistor 30 with the capacitance 31 shunted about the same. Conductor 33 connects the cathode to a point 34 on the inductance 28.

Any desired values may be given to the circuit elements employed in this oscillator. For example, the direct current voltage of direct current source 20 may be in the neighborhood of three hundred volts, the choke having a value of fifteen henries, the condenser 32 a value of 0.01 mf., the condenser 36 a value of 0.0005 mf., condenser 30, 0.001 mf. These values are, of course, approximate and will depend upon other variables. Eneregization of this circuit will produce oscillations, the frequency of which may be varied in accordance with variation of the characteristic values of the circuit elements. For the particular function of the invention we utilize preferably a sine wave of a frequency within the range of 5 to 100 kilocycles. The oscillation should be stable so as to develop a wave of relatively fixed frequency and magnitude.

The transmitter T found effective for the purposes of our invention is a crystal 37 of Rochelle salt or similar rock crystal possessing piezoelectric properties. It is formed preferably from a plurality of thin plates secured together and placed as a transverse unit in the electrode 38 at a point removed from the contact section 39. Electric contact is made from inductor points 34 and 35 to the opposite edges of this crystal by the circuit conductors 42 and 43. In this manner the electric oscillations from source O are channelled through the crystal 37. The crystal 37 should desirably have no pronounced natural frequency of vibration, that is, it should be susceptible to forced vibrations of a fairly wide range within the audible and supersonic sections of radiation. The effect of oscillation upon the crystal 37, as is well known, is to translate the electrical energy into mechanical energy of vibration and since the crystal is an integral part of the structure of the electrode 38, the vibration is transmitted throughout the same. In the case of electrodes 39 and 45 in which the intervening workpiece 11 is positioned the vibration is transmitted through the workpiece and electrode 45 to the receiver R.

The receiver R consists essentially of a crystal 47 which may be similar in construction and material to the crystal 37. The function of this crystal is to translate the mechanical energy of vibration back into electrical oscillations, the reverse of the action of crystal 37. This crystal is similarly connected at its edges by wire connectors 48 and 49, the connectors joining the crystal to amplifier unit A, where the wave form is amplified or otherwise modified in energy value. Transmission then continues to the meter M.

The meter M may be of varied form depending upon the nature of the transmitted wave. For example in the case of a supersonic oscillation frequency the meter may take the form of an oscilloscope which visually indicates the form of the transmitted wave and its magnitude. Alternatively, if the wave has a frequency within the audible range a sound meter may be utilized which indicates by the change in volume any variation in energy magnitude of the transmitted wave.

The operation of the apparatus may follow the steps as now described. With the electrodes fashioned as shown in Fig. 2 so as to include the crystals 37 and 47 as a unitary part thereof, and with the oscillator, amplifying and metering circuits connected as indicated, the operator of the welding machine brings the electrodes into engagement with the workpiece and pressure is applied as is usual in welding processes. At this time the energized oscillator passes electric energy to the crystal 37 which translates the same to mechanical vibration of the frequency of the oscillator in the electrode 38. This vibration is passed through the weld area and electrodes 45 to the crystal 47 where it is translated into electric oscillations in the R circuit. These oscillations may be now amplified if desired and then passed on to the meter where, if an oscilloscope is used, the oscillation appears as a uniform train of sine waves. Should the operator now apply the welding current the all rigid path of the workpiece is modified by the formation of the weld nugget 50 as shown in Fig. 1 which reduces the amount of energy transmitted in accordance with the laws effecting the transmission of vibrations in solids and liquids. This deviation from the normal rigid state in the vibration circuit due to the weld formation is indicated on the oscilloscope by a contraction of the amplitude of the normal vibratory movement of the wave, thus indicating a decrease in energy. By these means the operator becomes aware that the weld is sound. Alternatively should the amplitude of the wave pattern on the oscilloscope continue during the weld period without variation it would indicate that for some reason the workpiece was receiving insufficient electric energy at the weld point and that the weld consequently was defective.

The operation has been described hereinabove in connection with an oscilloscope providing visual means for indicating a defective welding. With such a visual means any desired frequency within an audible or supersonic range may be usable. However, in the case of use of frequencies within the audible range, as above indicated, a sound meter may be employed which for the normal vibration will transmit an audible sound of a given pitch and magnitude. With such a meter, a reduction in the magnitude of the sound as heard by the operator would be indication that the weld was good whereas a continuation of the sound without change of volume would be indication of a defective weld. Also recording meters may be used in which case the tests may be automatically completed.

It is pointed out that mechanical vibrations form a satisfactory means of detecting defective welds. Under certain conditions, however, electrical oscillations solely may be utilized as the testing agent, the essential requirement being modification of the oscillation train, of whatever nature, through formation of the weld nugget.

While we have described this invention with particular reference to resistance welding it is, of course, obvious that its application may be extended to other manufacturing operations involving a change in the physical state of the substance being treated. It should be pointed out further that the weld testing apparatus of the invention and its modifications enter intimately into another of applicants' inventions, a method and apparatus of heat control of a weld in accordance with the needed changes in energy transmission through the weld during the time it is being made. This invention is being made the subject of an application to be filed separately, mention being made here to indicate one of the more important of the utilities of the instant invention. Suffice it to say that this further invention of applicants' relates the instant invention to the heat control of the weld somewhat after the fashion of the relation of the line voltage detecting and heat control circuits in the pending application of Edwin M. Callender, Serial No. 483,606, filed April 19, 1943, now Patent No. 2,393,884, dated January 29, 1946. It is also apparent that modification may be made in the specific types of oscillators, transmitters, amplifiers and meters employed. For example, while indication of defective welds has been described as made by observation of relative meter values before and during the weld, the meter may be calibrated so as to determine faulty welds by a single determination during the weld. The scope of the invention therefore may be determined only from claims as appended.

What is claimed is:

1. In apparatus for detecting physical variations in embedded material during the time of said variations, a source of mechanical vibrations, a source of energy flow for securing said vibrations, single means for channelling said vibrations, a source of energy flow for modifying said vibrations through said material, and means for indicating variations in said vibrations during the time of said variations.

2. A method of detecting weld completion in a workpiece subject to weld heat which comprises channelling through the point of weld a train of vibrations subject to energy change during the weld time immediately before and during the time of weld and metering an energy component of said vibrations whereby deviations of the same from normal during the weld time may be ascertained.

3. A method of determining defective welds in an apparatus having co-acting electrodes and an interposed workpiece which comprises initiating a train of electric oscillations of constant magnitude, translating said oscillations into mechanical vibrations, channelling said vibrations through the workpiece at the point of weld, translating said mechanical vibrations into electric oscillations, and metering the oscillations derived from said mechanical vibrations, whereby deviations from normal in the workpiece material at the point of weld and during the time of weld may be determined.

4. In an apparatus for detecting defective welds in resistance welders, electrodes adapted to contact an interposed workpiece, a crystal having piezo-electric characteristics fixed to, and movable with each of said electrodes, an electrical oscillating circuit producing a train of constant oscillations connected to one of said crystals, and a circuit including a meter connected to the other of said crystals whereby oscillations developed in the oscillating circuit are channeled through the workpiece to said meter circuit.

5. A method of weld determination, which comprises passing through the point of weld prior to and during the welding operation a train of vibrations of a given magnitude subject to change on fusion at the weld point, and metering said vibrations throughout the weld time whereby completion of the weld, during the weld time, may be determined.

6. A method of utilizing change of energy flow due to a weld completion in a workpiece subject to weld heat which comprises placing the workpiece between coacting electrodes, passing energy through the electrodes and workpiece until fusion develops in the workpiece, establishing independently and automatically for each weld from a component of said energy flow a comparison base dependent on the physical state at the weld point prior to fusion for a given weld, and utilizing a deviation from said base due only to variation in physical state at the weld point during the same weld to operate translating apparatus.

7. Apparatus for detecting physical variations in solid material which comprises a power source available for producing said variations, a separate power source available for detection of the variations, single means connected to said material for channelling power from both of said sources through said material, and means for detecting said variations connected to said separate power source through said single means.

8. In apparatus for detecting physical variations in solid material, a source of electric energy, electrode means for establishing a predetermined line of energy flow through said material, and means for indicating physical variations caused by said energy flow, said indicating means including an indicator and a power circuit including said electrodes and subject to power change on development of physical variation in said material, and said indicating means being dependent for functioning only on said physical change.

9. A method for utilizing physical variations in a material during a transformation process step which comprises subjecting a part of the material to a directed flow of energy until the part is transformed, automatically fixing a component of said directed energy for each transformation before the transformation occurs, and utilizing the variation of said energy component due to change thereof through said transformation to operate energy-response mechanism.

10. A method of weld determination in electric resistance welding systems wherein a number of welds are formed in the workpiece and the workpiece at each weld point is subject to a physical change of state at fusion, which comprises establishing a substantially constant initial flow of energy through each weld point prior to fusion to fix a standard of comparison for that weld only, and utilizing the change in energy flow from said standard arising from fusion at the weld point to activate weld determination apparatus substantially independently of any variation occurring in said standard from weld to weld.

11. In welding apparatus for welding together separate articles by electric current passed through the weld point embodying a welding circuit including a pair of coacting electrodes adapted to receive a welding current and pass the same through said article to the zone to be welded, the combination comprising a source of energy, means for passing energy from said source to and through said electrodes and the zone to be welded prior to fusion of the articles at said zone, means for receiving energy impressed from said source from the zone to be welded, and means independent of the value of the welding power supplied to the zone to be welded prior to fusion for establishing in said energy-receiving means an electrical characteristic responsive to the difference in energy received by said response-establishing means prior to and after fusion of the parts to be welded.

12. In electric resistance welding appartus, the combination including a power source, coacting electrodes adapted to receive a workpiece for welding treatment, energy-response means connected to said electrodes, and means depenedent on weld formation in the workpiece and normally independent of absolute value of supply of welding power to said workpiece for actuating said energy-response means, and circuit connections between said source, electrodes, and energy-response means, said actuating means including a device sensitive to change of energy flow through said electrodes and workpiece for controlling actuation of said energy-response means.

13. A method of utilizing in electric resistance welding systems the change of energy flow through a workpiece weld point due to weld completion, which comprises placing a workpiece between coacting welding electrodes, passing a substantially constant flow of energy through the workpiece at the electrodes prior to fusion to establish a standard of comparison for that weld only; and utilizing the change in energy from said standard arising from fusion at the weld point to operate energy-response means substantially independently of the absolute value of said standard.

14. A method of utilizing in electric welding sytems energy change due to fusion at the weld point, which comprises passing a substantially constant flow of energy through the weld point prior to fusion to establish a standard of comparison for that weld only, and utilizing the change in energy from said standard arising from fusion at the weld point to actuate energy-response means substantially independently of the extent of said energy change.

JOHN P. TARBOX.
EDWIN M. CALLENDER.

REFERENCES CITED

The following references are of record in the file of this patent:

UNITED STATES PATENTS

| Number | Name | Date |
| --- | --- | --- |
| 2,280,226 | Firestone | Apr. 21, 1942 |
| 1,959,690 | Roth | May 22, 1934 |
| 2,306,593 | Collom | Dec. 29, 1942 |
| 1,938,499 | Ragsdale | Dec. 5, 1933 |
| 1,979,786 | Andrus | Nov. 6, 1934 |
| 2,101,108 | Tarbox | Dec. 7, 1937 |
| 2,104,749 | Jones | Jan. 11, 1938 |
| 2,164,638 | Broeze et al. | July 4, 1939 |
| 1,414,077 | Fessenden | Apr. 25, 1922 |
| 2,318,667 | Bruce | May 11, 1943 |
| 2,277,037 | Clark et al. | Mar. 24, 1942 |
| 2,222,906 | Hentzen | Nov. 26, 1942 |

FOREIGN PATENTS

| Number | Country | Date |
| --- | --- | --- |
| 336,766 | Great Britain | Oct. 23, 1930 |
| 569,598 | Germany | Feb. 4, 1933 |
| 270,583 | Germany | Feb. 18, 1914 |